United States Patent Office 3,780,005
Patented Dec. 18, 1973

3,780,005
CATALYST FOR THE PRODUCTION OF COPOLYMER
Charles Cozewith and Samuel B. Robison, Westfield, N.J., assignors to Esso Research and Engineering Company, Linden, N.J.
No Drawing. Continuation of abandoned application Ser. No. 822,726, May 7, 1969. This application Oct. 4, 1971, Ser. No. 186,522
Int. Cl. C08f 15/04
U.S. Cl. 260—88.2 R      8 Claims

ABSTRACT OF THE DISCLOSURE

A catalyst useful for copolymerizing ethylene and a higher alpha olefin is composed of an alkyl aluminum, and the reaction product of a vanadium compound and an aluminum alkoxy compound.

This is a continuation of application Ser. No. 822,726, filed May 7, 1969, and now abandoned.

BACKGROUND OF THE INVENTION

Field of the invention

This invention relates to the copolymerization of ethylene and a higher alpha olefin employing the novel catalyst system of this invention, more particularly the catalyst system employed herein is produced by the reaction of a vanadium halide with an aluminum oxyalkylate.

The use of vanadium haloalkoxide compounds as part the Ziegler catalyst system with an alkyl aluminum has been known, but such vanadium compounds are expensive to make, difficult to purify, and unstable in storage. Applicants have found a way to produce these vanadium haloalkoxide compounds either in situ or just before the reaction in which they are to be employed.

The purpose of this invention is to produce a novel catalyst for the polymerization of olefins by utilizing the reaction product of a vanadium halide and aluminum oxyalkylate.

SUMMARY OF THE INVENTION

It has now been found by the inventors that very valuable vanadium compounds, such as vanadium haloalkoxides, can be produced by the reaction of vanadium oxytrihalides and vanadium tetrahilides and aluminum oxyalkylate. When such vanadium and aluminum compounds are contacted, it has been found that an exchange of ligands takes place according to the general mechanism $$VO_zX_n + bAl(OR)_3 \longrightarrow VO_zX_{n-m}(OR)_m + bAl(OR)_{\frac{3-m}{b}}X_{\frac{m}{b}}$$

(I)

where X=Cl, Br, I; z=0 or 1; n=4 if z is 0; 3 if z is 1; R=alkyl or phenyl radical As an example of Reaction I, we have found that when solutions of VOCl$_3$ and aluminum isopropoxide are mixed, the value of the parameter $m$ in the above equation varies with the value of the parameter $b$ as illustrated below,

| b | m | Vanadyl chloroisopropoxide formed |
|---|---|---|
| ½ | 1 | Vanadyl dichloroisopropoxide. |
| 1 | 2 | Vanadyl chlorodiisopropoxide. |
| 2 | 3 | Vanadyl triisopropoxide. |

The amount of aluminum chloroalkoxide produced in the above reaction is not deleterious to the polymerization; consequently, it is not necessary to remove this component of the reaction mixture and the entire mixture can be reacted directly with an aluminum alkyl, in either the absence or presence of monomers, to form the active catalyst for ethylene-propylene copolymerization or ethylene-propylene-diene terpolymerization. Of course, if desired, the pure vanadium or vanadyl haloalkoxide compound can be recovered from its solution with $$AlCl_y(OR)_{3-y}$$

by distillation or some other suitable separation process.

The exchange Reaction I can also be carried out with aluminum chloroalkoxides such as AlCl(OR)$_2$ or $$AlCl_2(OR)$$

However, a larger quantity of these materials must be used to obtain the same degree of alkoxide substitution on the vanadium, and also compounds such as AlCl$_3$ may be produced which can lead to undesirable cationic side reactions in Ziegler polymerization.

The invention thus consists of the following two steps:
(a) The prereaction of a vanadium tetrahalide or a vanadyl trihalide and Al(OR)$_3$ in a suitable inert solvent to generate a solution containing the vanadium haloalkoxide, and
(b) The reaction of this solution with an aluminum alkyl compound to form a Ziegler catalyst system for use in polymerization.

Thus polymerization with this catalyst and the other common component of Ziegler catalysis, an aluminum alkyl compound, will produce a copolymer of valuable properties. Specifically, it has been found that the advantages of this invention are achieved by reacting a vanadium halide compound with a selected aluminum alkoxide compound to get the reaction product and then adding the aluminum alkyl compound to the resulting reaction product in order to produce the active catalyst composition. Although the vanadium compound, aluminum alkoxide, and aluminum alkyl catalyst components can be mixed simultaneously to form an active catalyst system, side reactions between the aluminum alkyl and aluminum alkoxide may prevent the formation of the desired vanadium haloalkoxide. This catalyst is then used to copolymerize ethylene and a higher alpha olefin.

About 1/10 to 10 moles, preferably 1/3 to 3 moles of the aluminum alkoxide compound are reacted per mole of vanadium compound; and about 2 to 100 moles, preferably 2 to 25 moles of aluminum alkyl compound is utilized per mole of vanadium plus aluminum in the reaction product to complete the Ziegler catalyst system.

The vanadium halides employed in this invention, have the formula VOX$_3$ or VX$_4$ wherein X is a halogen having an atomic number of more than 17, i.e., chlorine, bromine, or iodine. The preferred vanadium halide is VOCl$_3$.

The aluminum compounds of this invention have the general formula Al(OR)$_3$ where R is a C$_1$–C$_{12}$ alkyl radical. Thus, R may be a methyl, propyl, butyl, pentyl, isopentyl, octyl, or hexyl group.

The aluminum alkoxide and vanadium halide compound can be reacted in any inert solvent such as aliphatic, aromatic or chlorinated hydrocarbon. It has been found, however, that the reaction products are generally more soluble in aromatic compounds, such as benzene, or chlorinated compounds, such as carbon tetrachloride.

The alkyl aluminum compound to complete the Ziegler system which is useful in this invention has the formula R$_m$AlX$_n$ wherein R is a C$_1$–C$_{12}$ monovalent hydrocarbon radical, X is a halogen having an atomic number above 17 (i.e. Cl, Br, or I), or a C$_1$–C$_{12}$ monovalent hydrocarbon radical, $m$ is an integer between 1 and 3 inclusive, and the sum of $m$ plus $n$ is equal to 3.

Specific examples of R and/or X groups include methyl, ethyl, propyl, n-butyl, n-amyl, isoamyl, phenyl, tolyl, and cyclopentyl radicals. Preferred are the C$_1$–C$_5$ alkyl groups such as ethyl and butyl groups. The preferred halogen is chlorine.

Examples of suitable alkyl aluminum compounds include triethyl aluminum, tripropyl aluminum, diethyl aluminum chloride, ethyl aluminum dichloride, and aluminum ethyl sesquichloride. Mixtures of alkyl aluminum compounds can also be used.

The catalyst of this invention is used to copolymerize ethylene and a $C_3$–$C_{10}$ alpha olefin. The $C_3$–$C_{10}$ alpha olefin may be linear or branched where the branching occurs 3 or more carbon atoms from the double bond, and, while a single olefin is preferable, mixtures of these $C_3$–$C_{10}$ olefins may be employed. Suitable examples of $C_3$–$C_{10}$ alpha olefins include: propylene, 1-butene, 1-pentene, 1-hexene, 1-heptene, 1-octene, 1-nonene, 1-decene, 4-methyl-1-pentene, 4-methyl-1-hexene, 5-methyl-1-hexene, 4,4-dimethyl-1-pentene, 4-methyl-1-heptene, 5-methyl-1-heptene, 6-methyl-1-heptene, 4,4-dimethyl-1-hexene, 5,6,6-trimethyl-1-heptene, 5,5-dimethyl-1-octene, 5-methyl-1-nonene and the like; particularly preferred herein is propylene. The concentration of $C_3$–$C_{10}$ olefin monomer units in the final copolymer ranges in general from about 10% to about 75% by weight. The copolymers are generally elastomers, although where the ethylene content is relatively high (above about 75%), they have some of the properties of plastics and are often designated as "plastomers."

It is to be understood that the term "copolymer of ethylene and a $C_3$–$C_{10}$ alpha olefin" is meant to include such copolymers which additionally include a minor amount, i.e., about 0.1-20 wt. percent, preferably 1-10 wt. percent, of a nonconjugated diolefin to add unsaturation to the final product so that it may be conventionally sulfur-cured. Suitable diolefins include 5-methylene-2-norbornene, methyl norbornadiene, isopropenylnorbornene, 5-ethylidene-2-norbornene, dicyclopentadiene, 4,7,8,9-tetrahydroindene, 1,5-cyclooctadiene, and 1,4-hexadiene. In this invention 5-methylene-2-norbornene and 5-ethylidene-2-norbornene are preferred.

In preparing and using catalysts according to this invention, all the steps should be carried out in the absence of oxygen, moisture, carbon dioxide or other harmful impurities. This end is readily accomplished by blanketing all of the raw materials including the catalyst components, monomers and inert diluents with an inert gas such as dry nitrogen or argon. Preferably, all materials are purified, e.g. by drying, distillation, etc., prior to their use. The reaction temperature for the formation of the vanadium compound-aluminum compound catalyst component is suitably room temperature. This temperature is not critical, however, and either lower temperatures (e.g., 45° F.) or higher temperatures (e.g., 100° F.) may be used.

The conditions at which the polymerization reaction is carried out can vary over a wide range. Generally, temperatures from —40° to 150° C. can be used; however, temperatures ranging from 0° to 60° C. are preferred. Pressures from 0.2 to 1000 p.s.i.g. can be employed in the polymerization reaction; however, pressures in the range of from about 1 atmosphere to 10 atmospheres are more generally used. The reaction times used in the formation of the copolymers depend in general upon the temperatures used. Generally, reaction times from 1 minute to 5 hours can be employed; however, it is more usual to use reaction times ranging from 5 to 60 minutes.

The reaction vessel can be constructed of any material that is inert to the reactants and diluents used, and is capable of withstanding the operating pressures. Reaction vessels made of glass, stainless steel and glass-lined steel are quite satisfactory.

The copolymers of this invention are rubbery, or at least contain a substantial amount of amorphous material, and may be cured to useful vulcanizates. Where the copolymer has little or no unsaturation, i.e., does not contain a diolefin monomer, it may be cured with the use of certain free radical generators such as organic peroxides, e.g., dicumyl peroxide, or selected haloaliphatic compounds, e.g., octachlorocyclopentene. Where the copolymer contains unsaturation, conventional sulfur cures are possible. Generally, the copolymers have a molecular weight in the range of 50,000 to 1,000,000 as determined by intrinsic viscosity in Decalin solution at 135° C.

Various solvents may be used in the practice of this invention and they include aliphatic, naphthenic, aromatic, and halogenated hydrocarbon solvents, or an excess of the higher alpha olefin such as propylene may be used. Examples of solvents include n-hexane, propane, cyclohexane, toluene, xylenes, tetrachloroethylene, decalin, and chlorobenzenes. Preferably, n-hexane is used.

A variety of oils, carbon blacks, clays and silicas may be used as filler for the rubbers produced by this invention. The carbon blacks which are useful include SAF, SRF, HAF, FEF, and MPC blacks, all of which are commercially available. The amount of carbon black used can be from 0 to 300 parts by weight, but preferably 0 to 200 parts per 100 parts of elastomer is used. From 0 to 250 parts by weight of oil can also be added to obtain the desired balance of physical and processing properties in the final compound.

DESCRIPTION OF PREFERRED
EMBODIMENTS

This invention and its advantages will be better understood by reference to the following examples.

Examples 1–3

A 1.5 l. stirred reaction flask equipped with a cooling jacket and the necessary inlet and outlet connections was charged with 1 l. of dry heptane. The heptane was then saturated at 25° C. and 1 atm. pressure with an ethylene-propylene mixture containing 25 mol percent ethylene. The monomer gases were dried and deoxygenated before use. 1.0 mmol of AlEt$_2$Cl, the cocatalyst for the polymerization, was then added to the reactor. The catalyst solution was prepared by mixing 2 cc. of a .05 M carbon tetrachloride solution of VOCl$_3$ with the desired amount of a .05 M carbon tetrachloride solution of Al(O iso C$_3$H$_7$)$_3$. The resultant solution was added to the reactor and polymerization began immediately. The monomer mixture was continuously fed to the reactor during the run at a rate of 4.00 l./min. By circulating water through the reactor cooling jacket, the temperature was maintained at 25° C. The run was terminated after 30 min. by the addition of 5 cc. of isopropanol to the reactor. The reaction product was added to 3 l. of isopropanol to precipitate the copolymer which was then isolated and dried. The results are shown in Table I.

TABLE I

| Example | VOCl$_3$, mmol | Al(OiPr)$_3$, mmol | Polymer yield, g. | Catalyst efficiency, g., polymer/g., VOCl$_3$ | Polymer composition,[1] mole percent ethylene | Polymer, inherent visc.[2] |
|---|---|---|---|---|---|---|
| 1 | .1 | .05 | 9.6 | 555 | 56.0 | 2.55 |
| 2 | .1 | .1 | 8.6 | 497 | 59.8 | 1.30 |
| 3 | .1 | .2 | 7.2 | 414 | 60.0 | 1.64 |

[1] Measured by infrared analysis.
[2] Measured in Decalin at 135° C.

Example 4

The procedure was identical to that in Example 1 except that the catalyst mixture contained .2 mmol of $VOCl_3$ and 0.1 mol of $Al(O\ sec\ C_4H_9)_3$. Also, the monomer mixture contained 30 mol percent ethylene. 18.7 g. of copolymer containing 61.5 mol percent ethylene was obtained.

Example 5

Heptane was charged to the reactor and saturated with an ethylene-propylene mixture containing 30 mol percent ethylene as in Example 4. In this run, however, the catalyst solution containing .1 mol/l. of $VOCl_3$ and .05 mol/l. $Al(O\ sec\ C_4H_9)_3$ was pumped continuously into the reactor at a rate of 0.067 mmol $VOCl_3$/hr. $AlEt_2Cl$ solution was also pumped continuously into the reactor at a rate of 0.47 mmol $AlEt_2Cl$/hr. The monomer flow was maintained at 3.33 l./min. throughout the run. The run was terminated after 65 min. and 9.65 g. of polymer containing 70 mol. percent ethylene was recovered. This corresponds to a catalyst efficiency of 670 g. of copolymer/g. $VOCl_3$.

Example 6

The procedudre was identical to that in Example 1 except the cocatalyst was 1.0 mmol of $Al(i\ Bu)_3$. 9.0 g. of a copolymer containing 50.8 mol percent ethylene was obtained. The inherent viscosity of the polymer was 6.0.

Example 7

The procedure was identical to that in Example 1 except the cocatalyst was 1.0 mmol of $Al_2Et_3Cl_3$. 9.7 g. of a copolymer containing 53.6 mol percent ethylene was obtained. The inherent viscosity of the polymer was 3.5.

Example 8

This run was carried out in a continuous flow stirred reactor of 440 cm.³ volume. The catalyst solution was prepared by mixing 4 mmol of $VOCl_3$ with 2 mmol $Al(Oi\ Pr)_3$ in benzene. The cocatalyst was $AlEt_2Cl$. Dried normal heptane was pumped into the bottom of the reactor at a rate of 2.8 l./hr. Gaseous ethylene and propylene were also fed into the bottom of the reactor at a rate of .8 l./min. and 1.5 l./min. (at 1 atm. and 25° C.), respectively. A third monomer, 5-ethylidene-2-norbornene, was also added at a rate of 4.5 g./hr. The catalyst solution was pumped into the reactor at a rate of .94 mmol vanadium/hr., while the solution of $AlEt_2Cl$ was added separately at a rate of 7.5 mmol/hr. The reactor temperature was controlled at 28° C. by prechilling the heptane feed.

Unreacted monomers and the terpolymer solution in n-heptane overflowed from the reactor into a flash tank where the monomers were vented and the polymer cement accumulated. Isopropanol was continuously added to the polymer cement to deactivate the catalyst.

The terpolymer was recovered from solution by bubbling steam through the cement to precipitate the polymer in hot water. The polymer was then dried on a hot rubber mill.

A yield of 10 g. of terpolymer was obtained in 1½ hours. The polymer contained 66.0 mol percent ethylene and had a Mooney viscosity at 212° F. of 30.

100 parts of the terpolymer obtained in this run were mixed with the following:

| | Pts. |
|---|---|
| FEF black | 70 |
| SRF black | 30 |
| Flexon 886 oil | 100 |
| Stearic acid | 1 |
| Zinc oxide | 5 |
| Tuads | .5 |
| Tellurac | .5 |
| Tetrone A | .5 |
| Captax | .5 |
| Sulfur | .85 |

The mixture obtained was then vulcanized in a press for 30 min. at 320° F. to give a product with the following properties:

Tensile strength—1420 p.s.i.
Elongation at break—490%
Modulus at 300%—760 p.s.i.
Shore A Hardness—51

Example 9

The same continuous polymerization reactor and procedure was used as in Example 8; however, in this run the catalyst consisted of a 2/1 molar mixture of VCl and $Al(Oi\ Pr)_3$ dissolved in benzene. The feeds to the reactor were as follows:

$VCl_4$—9 mmol/hr.
$AlEt_2Cl$—5.4 mmol/hr.
Ethylene—48 Nl/hr.
Propylene—108 Nl/hr.
n-Heptane—3 l/hr.

A temperature of 26° C. was maintained during the run.
In 15 min. of operation, 10 g. of copolymer was obtained containing 55 wt. percent ethylene.

It is to be understood that this invention is not limited to specific examples set forth herein, which have been offered merely as illustration, and that modifications may be made without departure from the spirit and scope of the appended claims.

What is claimed is:

1. A method for producing copolymers of ethylene and higher alpha olefins consisting of adding to a mixture comprising ethylene and a $C_3$ to $C_{10}$ higher alpha olefin:
   (a) a solution of catalyst component, prepared by mixing, in a suitable solvent, (1) mole of a vanadium compound selected from the group consisting of vanadium oxytrihalides or vanadium tetrahalides; and (2) from 0.1 to 10 moles of an aluminum alkoxy compound having the general formula $Al(OR)_3$ where R is a $C_1$ to $C_{12}$ hydrocarbon radical;
   (b) as cocatalyst, an aluminum alkyl compound having the general formula $R_mAlX_n$ where R is a $C_1$-$C_{12}$ monovalent hydrocarbon radical, X is selected from the group consisting of Cl, Br, I and a $C_1$-$C_{12}$ monovalent hydrocarbon radical, m is an integer between 1 and 3 inclusive and the sum of m plus n is 3; and
   (c) copolymerizing said ethylene and higher alpha olefins in the presence of said reaction product and cocatalyst; and
   (d) recovering said copolymer.

2. The method of claim 1, wherein said aluminum alkyl compound is aluminum diethyl chloride.

3. The method of claim 1, wherein said solution of catalyst component consists of the reaction products produced from reacting together one mole of vanadium oxytrichloride with from ⅓ to 3 moles of aluminum tri-isopropoxide.

4. The method of claim 1, wherein the aluminum alkoxy compound is aluminum tri(sec-butoxide).

5. The method of claim 1, wherein the higher alpha olefin is propylene.

6. The method of claim 1, wherein the vanadium compound is $VCl_4$.

7. The method of claim 1, wherein said solution of catalyst component consists of the reaction products produced from reacting together one mole of vanadium tetrachloride with from ⅓ to 3 moles of aluminum tri-isopropoxide.

8. A polymerization catalyst for producing copolymers of ethylene and higher alpha olefins consisting of:
  (a) the reaction product of (1) a vanadium compound selected from the group consisting of vanadium oxytrihalides or vanadium tetrahalides; and (2) an aluminum alkoxy compound having the general formula $Al(OR)_3$ where R is a $C_1$–$C_{12}$ hydrocarbon radical; reduced with
  (b) an aluminum alkyl compound having the general formula $R_mAlX_n$ wherein R is a $C_1$–$C_{12}$ monovalent hydrocarbon radical, X is selected from the group consisting of a halogen having an atomic number above 17 and a $C_1$–$C_{12}$ monovalent hydrocarbon radical, $m$ is an integer between 1 and 3 inclusive and the sum of $m$ plus $n$ is 3.

References Cited

UNITED STATES PATENTS

| | | | |
|---|---|---|---|
| 3,288,768 | 11/1966 | Shiga | 260—88.2 |
| 3,567,653 | 3/1971 | Wagensommer | 252—429 |
| 3,597,367 | 8/1971 | Apotheker | 252—429 |
| 3,634,377 | 1/1972 | Hori et al. | 260—88.2 |
| 3,696,086 | 10/1972 | Wagensommer | 260—80.78 |

JOSEPH L. SCHOFER, Primary Examiner

R. S. BENJAMIN, Assistant Examiner

U.S. Cl. X.R.

260—94.9 E; 252—429 C